(12) United States Patent
Zhang et al.

(10) Patent No.: US 11,832,091 B2
(45) Date of Patent: Nov. 28, 2023

(54) TIMING ADVANCE CONFIGURATION FOR UPLINK COMMUNICATION RESOURCES

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/644,740

(22) Filed: Dec. 16, 2021

(65) Prior Publication Data

US 2023/0199687 A1 Jun. 22, 2023

(51) Int. Cl.
*H04W 56/00* (2009.01)
*H04L 5/16* (2006.01)

(52) U.S. Cl.
CPC ........... *H04W 56/0045* (2013.01); *H04L 5/16* (2013.01)

(58) Field of Classification Search
CPC .............................. H04W 56/0045; H04L 5/16
See application file for complete search history.

(56) References Cited

U.S. PATENT DOCUMENTS

| | | | | |
|---|---|---|---|---|
| 2009/0092066 A1* | 4/2009 | Chindapol | ............ | H04W 76/45 370/277 |
| 2009/0122731 A1* | 5/2009 | Montojo | ............. | H04L 27/2647 370/280 |
| 2011/0051633 A1* | 3/2011 | Pan | ................... | H04W 56/0045 370/336 |
| 2011/0280176 A1* | 11/2011 | Lee | ..................... | H04L 27/2613 370/315 |

(Continued)

FOREIGN PATENT DOCUMENTS

| | | | | |
|---|---|---|---|---|
| CN | 110167133 A | * | 8/2019 | ............. H04L 5/001 |
| KR | 20090070737 A | * | 7/2009 | ......... H04L 27/2602 |

OTHER PUBLICATIONS

MediaTek Inc., "TDM UL transmission for TDD-FDD DL CA capable UE with single transmitter", 3GPP TSG-RAN WG1 Meeting #75, R1-135430, San Francisco, US, Nov. 11-15, 2013 (Year: 2013).*

(Continued)

*Primary Examiner* — Shah M Rahman
(74) *Attorney, Agent, or Firm* — Patterson + Sheridan, LLP

(57) ABSTRACT

Certain aspects of the present disclosure provide techniques for configuring timing advances for uplink communications resources. A method for wireless communications by a user equipment includes receiving, from a base station, signaling that configures a first timing advance and a second timing advance. The first timing advance is configured to be used by the user equipment when transmitting an uplink communi- (Continued)

cation in a half-duplex resource, and the second timing advance is configured to be used by the user equipment when transmitting an uplink communication in a full-duplex resource. The method may further include transmitting, to the base station, a first uplink communication within a first resource using one of the first timing advance or the second timing advance based on whether the first resource comprises a half-duplex resource or a full duplex resource.

20 Claims, 12 Drawing Sheets

(56) References Cited

U.S. PATENT DOCUMENTS

| | | | |
|---|---|---|---|
| 2014/0161110 A1* | 6/2014 | Kim | H04L 5/0028 370/336 |
| 2015/0003302 A1* | 1/2015 | Ekpenyong | H04L 1/1861 370/280 |
| 2015/0189610 A1* | 7/2015 | Siomina | H04L 5/14 370/280 |
| 2015/0230268 A1* | 8/2015 | Chen | H04L 5/001 370/280 |
| 2016/0014753 A1* | 1/2016 | Wu | H04L 27/2607 370/280 |
| 2017/0331577 A1* | 11/2017 | Parkvall | H04W 4/00 |
| 2019/0037514 A1* | 1/2019 | Seo | H04L 5/1469 |
| 2019/0068355 A1* | 2/2019 | Ode | H04W 72/0446 |
| 2019/0140811 A1* | 5/2019 | Abedini | H04L 5/14 |
| 2020/0313837 A1* | 10/2020 | Vejlgaard | H04W 72/541 |
| 2020/0337011 A1* | 10/2020 | Jiang | H04W 56/0015 |
| 2021/0135770 A1* | 5/2021 | Schober | H04L 5/003 |
| 2022/0085964 A1* | 3/2022 | Zhang | H04L 5/1469 |
| 2022/0200777 A1* | 6/2022 | Lee | H04W 72/0453 |

OTHER PUBLICATIONS

MediaTek Inc., "TDM UL transmission for TDD-FDD DL CA-capable UE with single transmitter", 3GPP TSG-RAN WG1 Meeting #76, R1-140236, Prague, CZ Rep., Feb. 10-14, 2014 (Year: 2014).*

Samsung, "Multiple TA for TDD-FDD CA", 3GPP TSG RAN WG1 #76, R1-140365, Prague, Czech Republic, Feb. 10-14, 2014 (Year: 2014).*

* cited by examiner

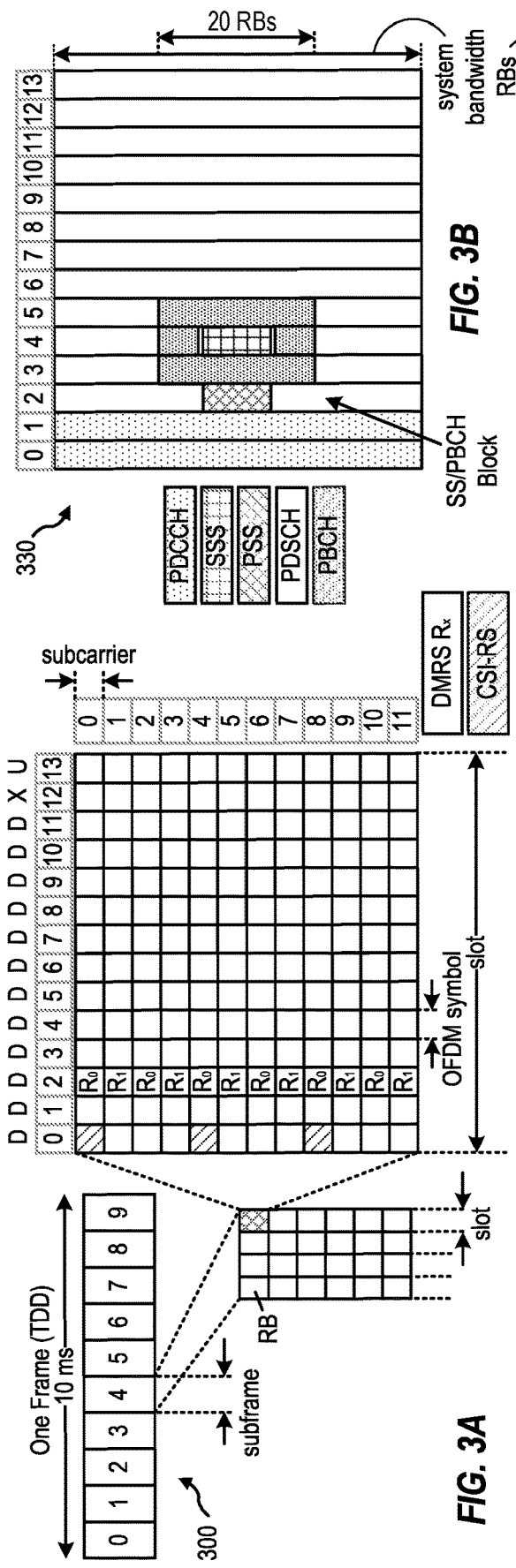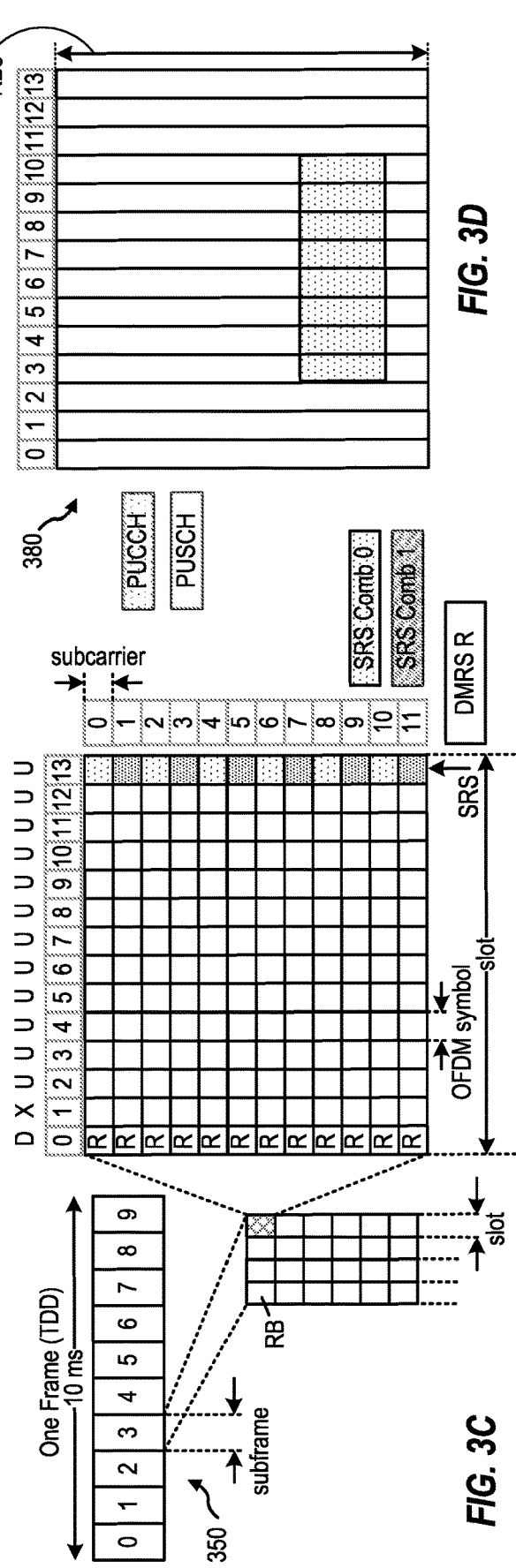

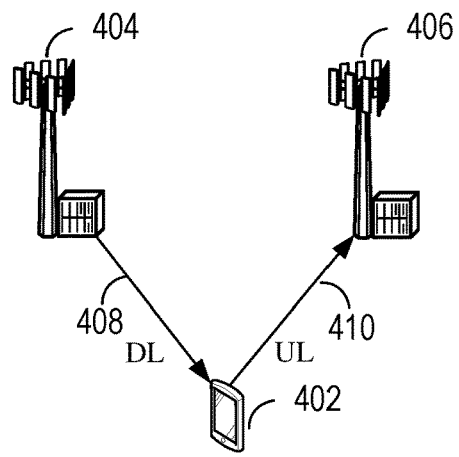
FIG. 4A
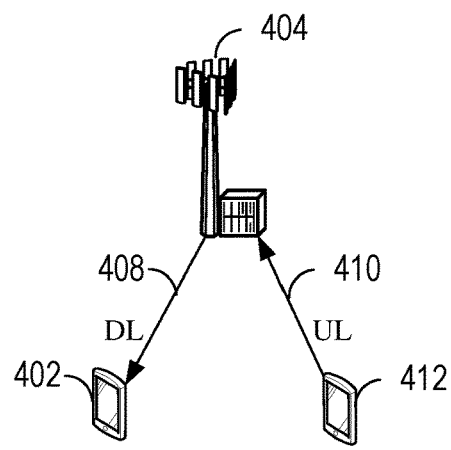
FIG. 4B
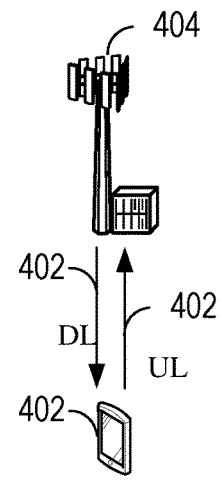
FIG. 4C
FIG. 4

TIMING ADVANCE CONFIGURATION FOR UPLINK COMMUNICATION RESOURCES

INTRODUCTION

Aspects of the present disclosure relate to wireless communications, and more particularly, to techniques for configuring timing advances for uplink communication resources.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment, including receiving, from a base station, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource; and transmitting, to the base station, a first uplink communication within a first resource using one of the first timing advance or the second timing advance based on whether the first resource comprises a half-duplex resource or a full duplex resource.

Another aspect provides a method for wireless communications by a base station, including transmitting, to a user equipment, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource; and receiving, from the user equipment, a first uplink communication within a first resource using one of the first timing advance or the second timing advance based on whether the first resource comprises a half-duplex resource or a full duplex resource.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIGS. 4A-4C depict different full-duplex use cases within a wireless communication network.

DETAILED DESCRIPTION

Figure 1:
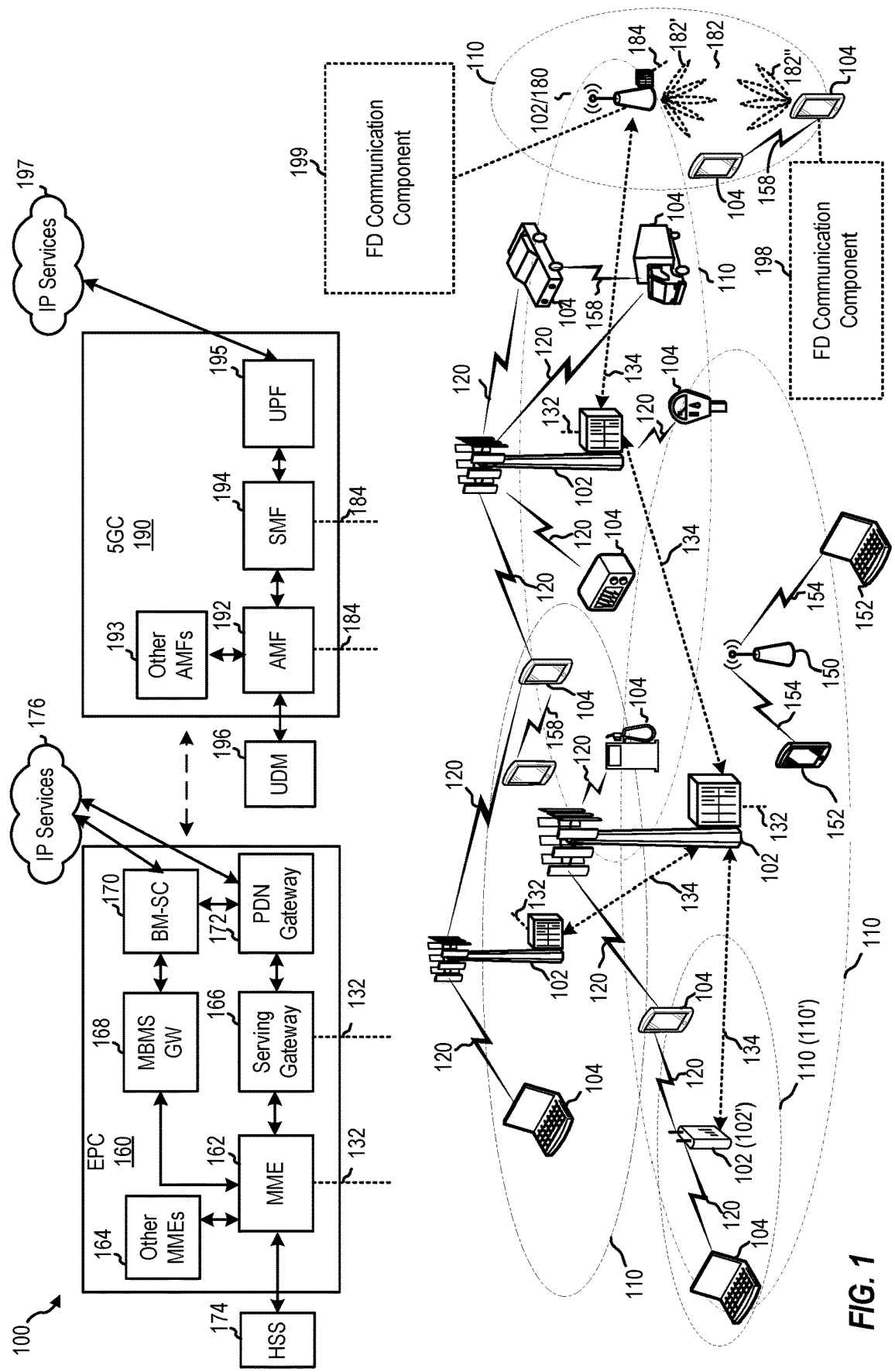
FIG. 1 is a block diagram conceptually illustrating an example wireless communication network.

Aspects of the present disclosure provide apparatuses, methods, processing systems, and computer-readable mediums for configuring timing advances for uplink communication resources.

In a wireless communication network, full-duplex (FD) modes generally enables simultaneous uplink (UL) and downlink (DL) transmission. Full-duplex capability can be present at a base station (BS, for example, a gNB), user equipment (UE), or in some scenarios, both the base station and the user equipment. For example, at a user equipment, an uplink communication may be transmitted from one panel while a downlink communication is received on another panel. Similarly, at a base station, an uplink communication can be received at one panel while a downlink communication is transmitted via another panel. Generally, full-duplex may provide benefits such as latency reduction, spectrum efficiency enhancement, more efficient resource utilization, and coverage enhancement. However, when servicing user equipments having differing capabilities (e.g., legacy user equipment that do not support full-duplex), a base station may switch between full-duplex mode and other modes, such as half-duplex.

Half-duplex (HD) generally enables separate uplink and downlink transmission. In one half-duplex configuration, frequency division duplexing (FDD) is used such that, for example, an uplink communication is received in one block of spectrum and a downlink communication is transmitted in another block of spectrum. In another configuration, time division duplexing (TDD) separates, for example, uplink communications from downlink communications by using different time slots within the same frequency band. Half-duplex operations generally incur a delay when switching between uplink and downlink communication operations.

Half-duplex and full-duplex modes generally require different timing advances. In half-duplex mode, the uplink receiving slot start time may generally be earlier than the downlink transmission slot start time in order to allow for the uplink to downlink switching delay. For example, a base station panel can be switched from uplink to downlink after the switching delay in half-duplex mode. On the other hand, when the base station is operating in full-duplex mode, the slot start times may generally be aligned at the base station in order to mitigate self-interference. Conventionally, a base station reconfigures the timing advance for user equipments it is serving when switching between duplex modes by sending timing advance configuration data before every slot in which a mode switch is to occur. This results in delays due to the time it takes to transmit and process the timing advance configuration at the user equipment, especially in scenarios with frequent switching.

Aspects of the present disclosure improve upon the conventional approach by configuring multiple timing advances at a user equipment in advance of a mode switch by the base station. In this way, a user equipment can switch between a first timing advance configured for half-duplex operations by a base station and a second timing advance configured for full-duplex operations by the base station without receiving additional configuration data from the base station. Thus, aspects described herein provide benefits, including reduced communication latency, coverage enhancement, and more efficient resource utilization in order to provide a better user experience.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes timing advance (TA) configuration component 199, which may be configured to perform operations for configuring timing advances for uplink communication resources, such as illustrated in one or more of FIG. 5, 6, 7, 8, or 10. Wireless communication network 100 further includes TA configuration component 198, which may be used configured to perform operations for configuring timing advances for uplink communication resources, such as illustrated in one or more of FIG. 9.

Figure 2:
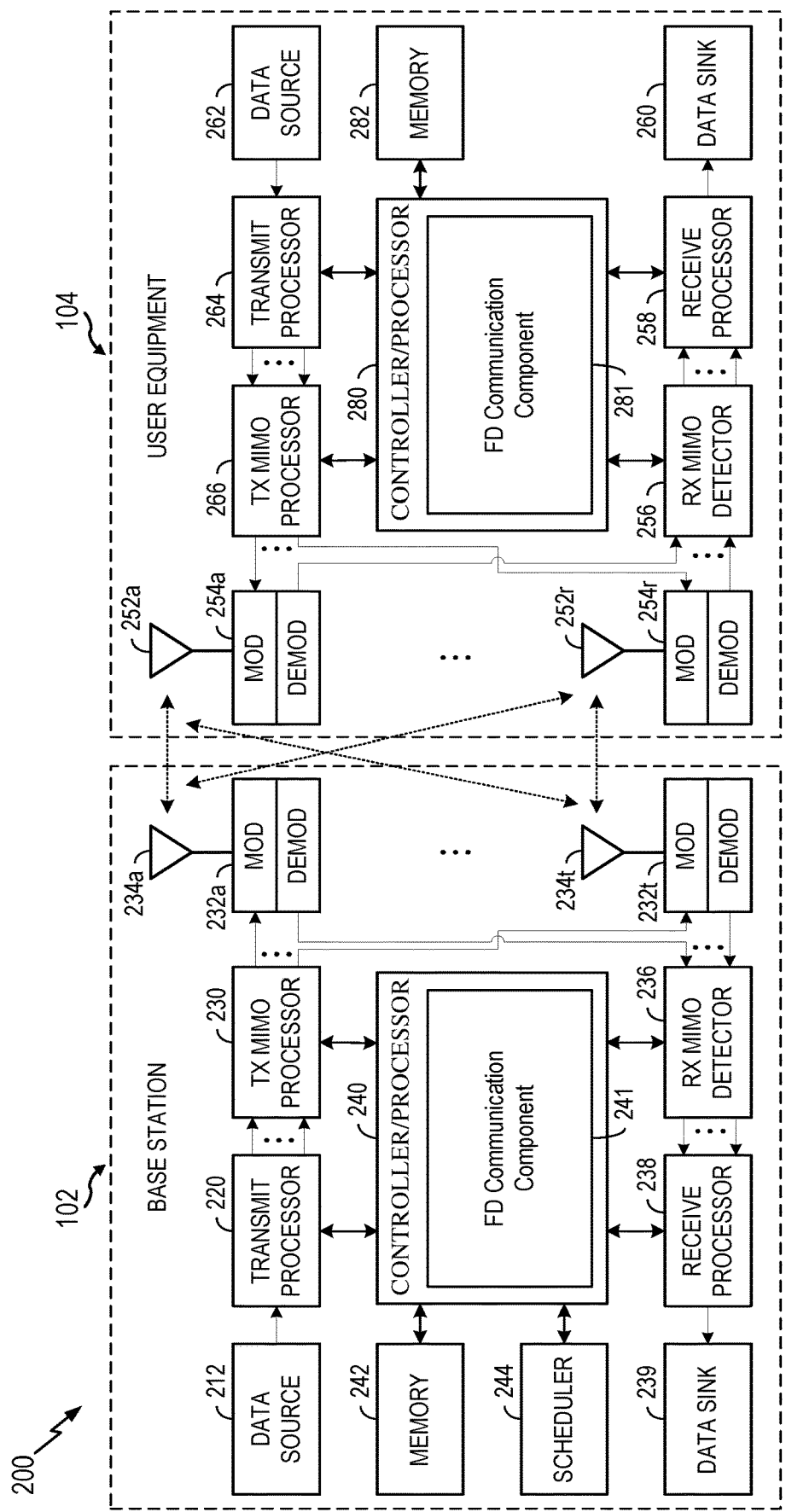
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes TA configuration component 241, which may be representative of TA configuration component 199 of FIG. 1. Notably, while depicted as an aspect of controller/processor 240, TA configuration component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes TA configuration component 281, which may be representative of TA configuration component 198 of FIG. 1. Notably, while depicted as an aspect of controller/processor 280, TA configuration component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Aspects Related to Full-Duplex Communication Modes

As noted above, wireless communication devices may generally be configured for half-duplex (HD) and/or full-duplex (FD) communication modes.

Generally, FD capability can be present at either a BS, the UE, or both. In some cases, FD capability may be conditioned on beam separation (e.g., frequency separation or spatial separation). FD capability generally provides for reduced transmission and reception latency (e.g., it may be possible to receive DL transmissions in an UL-only slot), increased spectrum efficiency (e.g., per cell and/or per UE), and more efficient resource utilization.

FIGS. 4A-4C illustrate different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 simultaneously receives DL transmissions 408 from the BS 404 and transmits UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 receives a DL transmission 408 from the BS 404 while another UE 412 simultaneously transmits an UL transmission 410 to the BS 404. Thus, in this example, BS 404 is conducting simultaneous uplink and downlink communications.

A third FD use case is illustrated in FIG. 4C involving one BS and one UE. As illustrated, the UE 402 receives DL transmissions 408 from the BS 404 and simultaneously transmits UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline 5G behavior |
| FD disabled | FD enabled | Use case #1 (FIG. 4A) for mTRP |
| FD enabled | FD disabled | Use case #2 (FIG. 4B) |
| FD enabled | FD enabled | Use case #3 (FIG. 4C) |

As in Table 1, if FD capability is disabled at both the base station and UE, the baseline 5G behavior may be used (e.g., HD communication). If FD capability is disabled at the BS but enabled at the UE, the UE may operate according to the first example FD use case shown in FIG. 4A in which the UE communicates with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS communicates with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands, generally separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but in different time resources.

As noted above, FD communication provides for reduced transmission and reception latency, increased spectrum efficiency, more efficient resource utilization, and coverage enhancement.

Aspects Related to Timing Advances

Networks may use timing advance configurations to ensure that UL transmissions from multiple UEs are synchronized when received by the BS. Generally, a TA is a command sent by a BS to a UE instructing the UE to adjust its uplink transmission relative to the current timing of the current downlink reception. This gives the UE a setting for the amount of time it needs to advance the UL transmissions.

TA adjustments for UL communications generally apply to, for example, physical uplink shared channel (PUSCH), physical uplink control channel (PUCCH), and sounding reference signals (SRS). In some implementations, the timing control procedure is initiated by the medium access control (MAC) layer and conveyed to the physical (PHY) layer for timing advance adjustment.

Aspects Related to Separate Timing Advances for Base Station in Full-Duplex Mode and Base Station in Half-Duplex Mode Aspects described herein relate to techniques for configuring timing advances (TA) for uplink communication resources, and specifically to configuring separate timing advances for user equipments served by a base station operating in full-duplex mode and half-duplex mode.

When a base station is switching between half-duplex and full-duplex modes, sending timing advances before every slot where the mode is switching results in communication latency as the user equipment has to receive, decode, and apply the new TA configuration every time it is updated. To overcome this shortcoming, methods described herein configure multiple timing advances in advance, such that the user equipment can rapidly apply timing advances appropriate for HD and FD communication modes without the base station needing to reconfigure the user equipment when either mode is used. This results in saving time by reducing time to processing and apply the timing advances.

Figure 5:
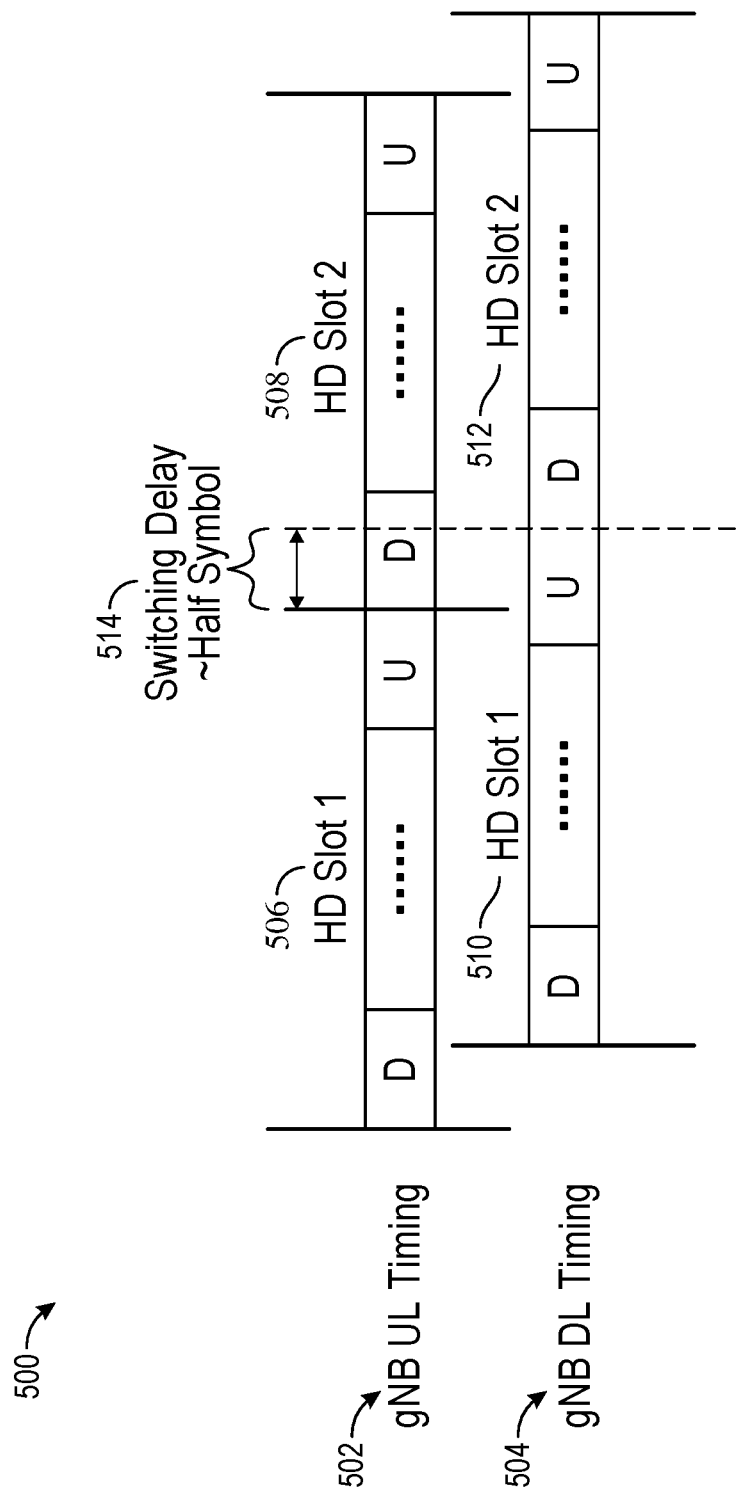
FIG. 5 depicts an example timing diagram of uplink and downlink timing for half-duplex mode at a base station.

FIG. 5 depicts an example timing diagram 500 of uplink and downlink timing for half-duplex mode at a base station. The base station uplink timing 502 comprises half-duplex slot 1 506 and half-duplex slot 2 508, each of which include various symbols including downlink (D) and uplink (U) symbols. The base station downlink timing 504 comprises half-duplex slot 1 510 and half-duplex slot 2 512. As depicted by the switching delay 514, the uplink slot start time precedes the downlink slot start time (e.g., by approximately a half symbol in some implementations). This switching delay 514 accommodates the base station uplink to downlink switching delay.

Figure 6:
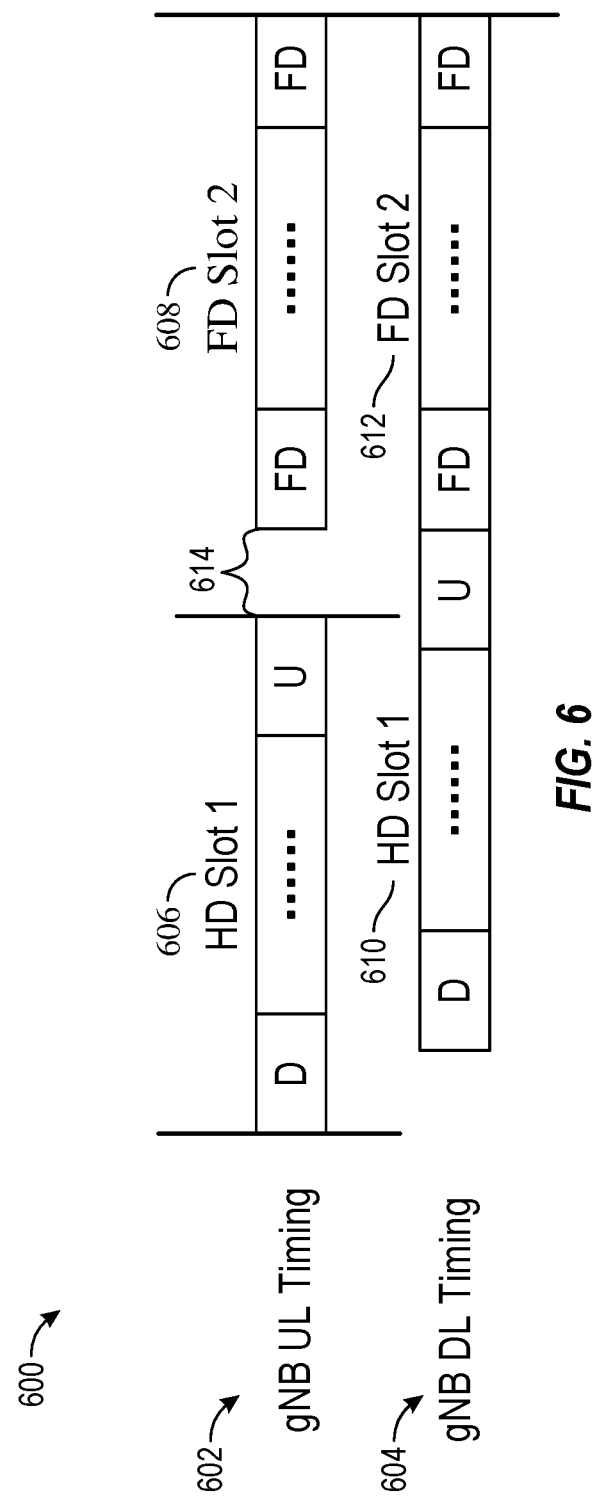
FIG. 6 depicts another example timing diagram of uplink and downlink timing for a base station operating alternatively in half-duplex mode and full-duplex mode.

FIG. 6 depicts another example timing diagram 600 of uplink and downlink timing for a base station operating alternately in half-duplex mode and full-duplex mode. The base station uplink timing 602 comprises half-duplex slot 1 606 and full-duplex slot 2 608, which include various D and U symbols. The base station downlink timing 604 comprises half-duplex slot 1 610 and full-duplex slot 2 612. As depicted, there is a gap 614 when the base station uplink timing 602 switches from half-duplex mode to full-duplex mode.

In full-duplex mode, the time difference between uplink and downlink slots should generally be less than that of the cyclic prefix (CP), for example, to avoid inter-symbol interference (ISI).

As discussed above, conventionally, to make a switch between half-duplex mode slots and full-duplex mode slots, a base station would need to reconfigure a user equipment's timing advance based on the differing timing requirements between half-duplex and full-duplex modes. The conventional procedure would thus take time (e.g., multiple slots) to transmit a new timing advance and allow a user equipment to implement the new timing advance. This conventional procedure created latency and network overhead.

To overcome the shortcoming of conventional methods, aspects described herein provide techniques for configuring multiple time advances for user equipments simultaneously. For example, a base station may configure two different timing advances for user equipments, one for half-duplex mode slots and one for full-duplex mode slots. In this way, a user equipment may switch from one preconfigured timing advance to another preconfigured timing advance depending on the mode the base station is operating in (e.g., half-duplex or full-duplex) without having to be reconfigured between the base station mode switch. Beneficially, then, latency is reduced and spectrum efficiency is increased.

The base station may configure a user equipment with separate timing advances in various ways. For example, the base station may instruct the user equipment to use a first timing advance during half-duplex slots and a second timing during full-duplex slots, which are known in advance by the base station. The base station may further define certain time and frequency resources dedicated for full-duplex slots and associate a full-duplex-specific timing advance to those resources when used by a user equipment. For example, the full-duplex slots may be associated with dedicated bandwidth parts (BWPs) or specific symbols or slots.

Because the base-station knows its own scheduling, it may not always require a gap when switching between half-duplex and full-duplex modes, as shown in FIG. 6. Beneficially, when a user equipment is configured in advance with timing advances associated with each mode, this switch may happen without a gap and the user equipment may react without further configuration, thus reducing latency in base station and user equipment communications.

Figure 7:
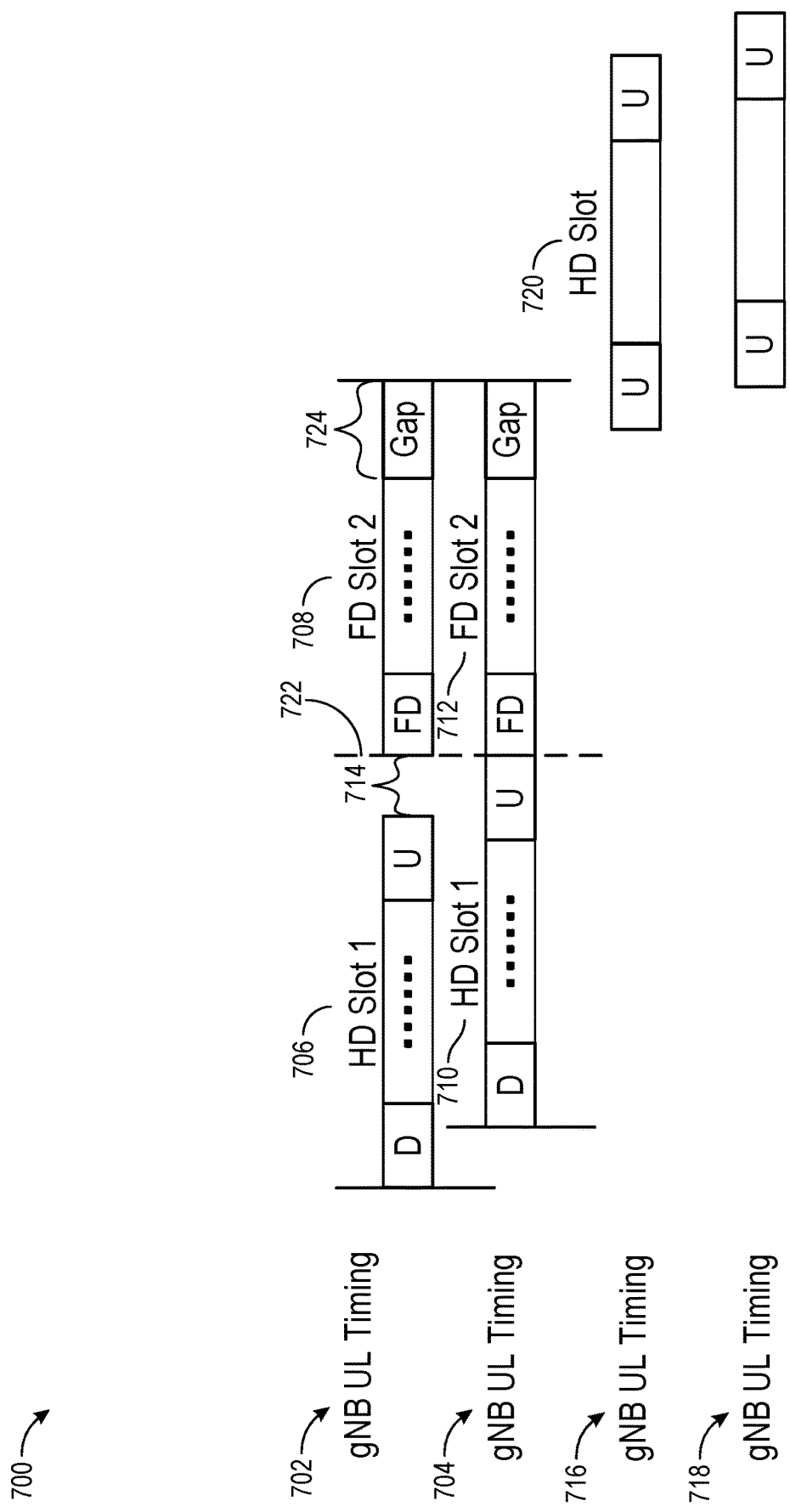
FIG. 7 depicts a timing diagram for a base station switching from half-duplex mode to full-duplex mode and back to half-duplex mode.

FIG. 7 depicts a timing diagram for a base station switching from half-duplex mode to full-duplex mode and back to half-duplex mode 700. The base station uplink timing 702 comprises half-duplex slot 1 706 and full-duplex slot 2 708. The base station downlink timing 704 comprises half-duplex slot 1 710 and full-duplex slot 2 712. As depicted, there is a gap 714 when the base station uplink timing 602 switches from half-duplex mode to full-duplex mode. The gap 714 ensures that the full-duplex slots are aligned at 722 for the base station uplink timing 702 and base station downlink timing 704.

FIG. 7 further depicts base station uplink timing 716 and base station downlink timing 718 when switching back to half duplex mode for half-duplex slot 720. Specifically, when switching back to half-duplex mode for half-duplex slot 720, the end of the full-duplex slot 708 includes a gap period 724 (e.g., one or more symbols) that absorbs the timing advance for the base station uplink timing 716 for half-duplex slot 720.

Note that in some cases a legacy user equipment may not be able to preconfigure two separate timing advances as described above. One option in such cases is to not allow the legacy user equipment to use full-duplex resources. Another option is for the legacy user equipment to update the timing advance via an existing symbol before switching to a full-duplex slot.

Figure 8:
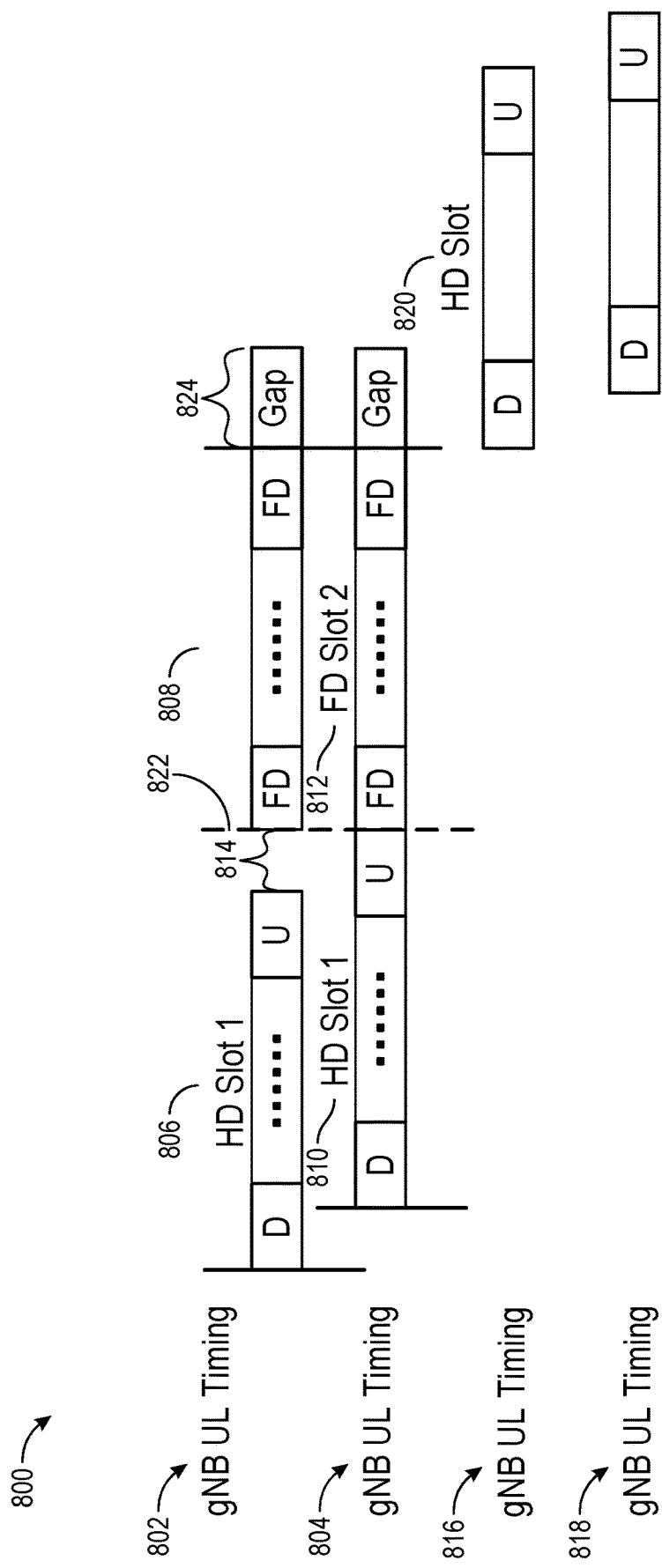
FIG. 8 depicts another example timing diagram of uplink and downlink timing for a base station operating in half-duplex mode and full-duplex mode.

FIG. 8 depicts another example timing diagram 800 of uplink and downlink timing for a base station operating in half-duplex mode and full-duplex mode. In the example 800, the base station uplink timing 802 comprises half-duplex slot 1 806 and full-duplex slot 2 808. The base station downlink timing 804 comprises half-duplex slot 1 810 and full-duplex slot 2 812. In this example, there is a gap 814 when the base station uplink timing 802 switches from half-duplex mode to full-duplex mode. The full-duplex slots are aligned at 822 for the base station uplink timing 802 and base station downlink timing 804.

Here, when switching back to half-duplex slot 820, the first symbol in half-duplex slot 820 is D. Notably, a time gap may only be necessary for half-duplex slot formats starting with a U symbol, such as in half-duplex slot 720 of FIG. 7. In aspects where the format of a slot following an full-duplex slot (e.g., slot 808) starts with a D symbol instead, the base station may use a flexible (F) symbol between a D to U symbol transition between slots as a gap symbol in the existing slot format without requiring an additional gap symbol.

The time gap may generally be greater than the slot boundary time difference from half-duplex uplink and downlink slots. For example, the time gap should be greater than the uplink to downlink switching time. Generally, the uplink to downlink switching time is approximately 4.7 us in 120 kHz SCS. This corresponds to about a half symbol. In this aspect, a new gap symbol 824 can be defined as a rule. For example, the rule may be defined such that the last symbol in a full-duplex slot when switching from full-duplex to half-duplex is an empty gap symbol 824, as depicted here. In scenarios where there are pre-configured instructions on the gap symbol, the user equipment can ignore the uplink or downlink symbols.

In one aspect, when utilizing a legacy timing advance MAC control element (MAC-CE) to update the timing advance, the base station may need to send the MAC-CE a threshold amount of time (e.g., 3 µs) before the switching boundary. This allows the UE to apply a different HD TA, which may require the base station to prioritize the MAC-CE at that time.

Example Methods for Configuring Multiple Timing Advances

Figure 9:
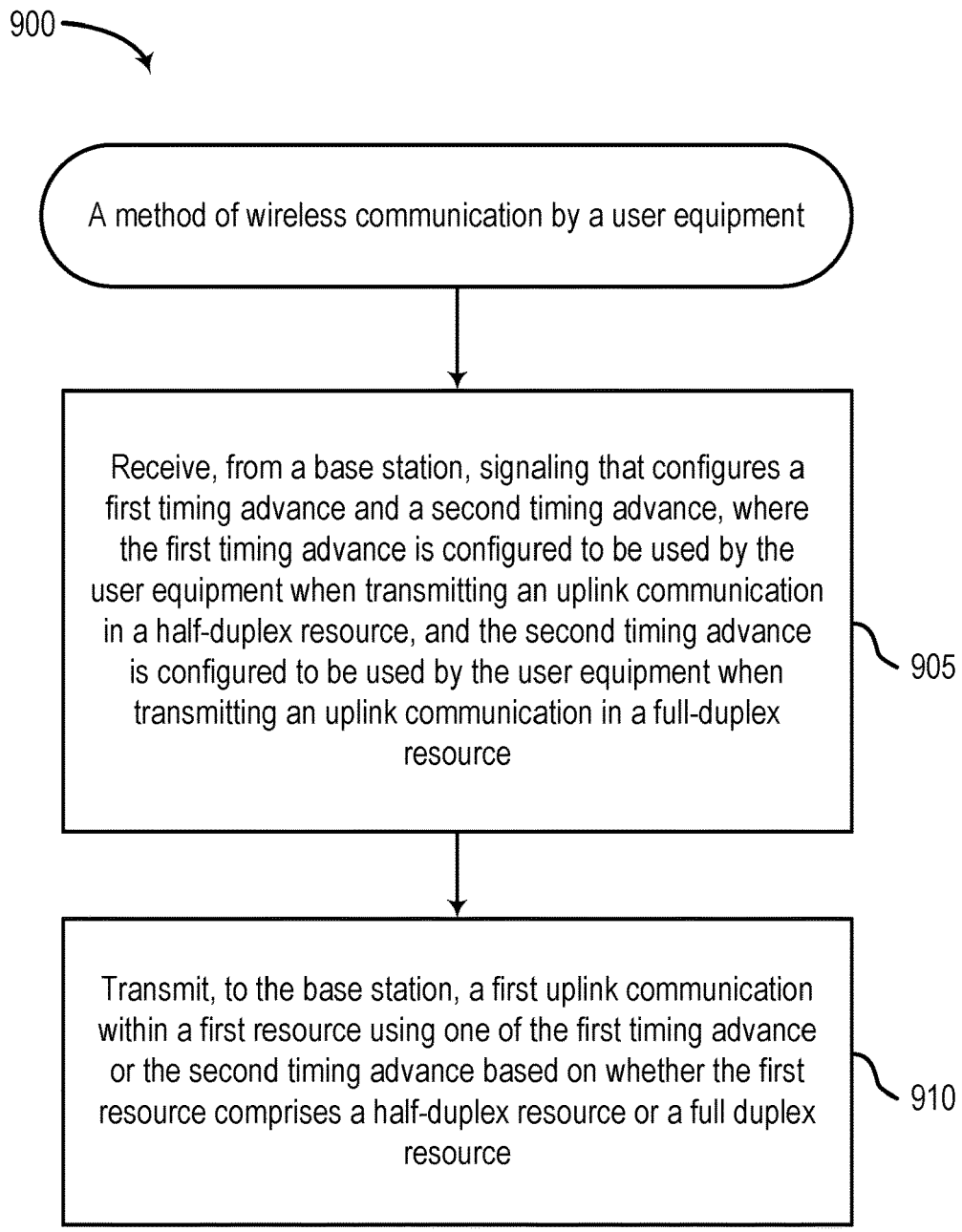
FIG. 9 is a flow diagram illustrating example processes for wireless communication according to aspects of the present disclosure.

FIG. 9 shows an example of a method 900 for wireless communication according to aspects of the present disclosure. In some aspects, a user equipment, such as UE 104 of FIGS. 1 and 2, or processing system 1105 of FIG. 11, may perform the method 900.

Operation 905 beings with receiving, from a base station, signaling that configures a first timing advance and a second timing advance, where the first timing advance is configured to be used by the user equipment when transmitting an uplink communication in a half-duplex resource, and the second timing advance is configured to be used by the user equipment when transmitting an uplink communication in a full-duplex resource. In some cases, the operations of this step refer to, or may be performed by, timing advance configuration circuitry 1115 as described with reference to FIG. 11.

Operation 910 continues with transmitting, to the base station, a first uplink communication within a first resource using one of the first timing advance or the second timing advance based on whether the first resource comprises a half-duplex resource or a full duplex resource. In some cases, the operations of this step refer to, or may be performed by, uplink transmission circuitry 1120 as described with reference to FIG. 11.

In some aspects, the first resource comprises a half-duplex resource and the first uplink communication is transmitted using the first timing advance. In some aspects, the method 900 further includes transmitting, to the base station, a second uplink communication within a second resource using the second timing advance based on the second resource being a full-duplex resource, as depicted in FIGS. 6, 7 and 8.

In some aspects, the signaling that configures the first timing advance and the second timing advance further configures a first subset of resources in which the user equipment shall use the first timing advance and a second subset of resource in which the user equipment shall use the second timing advance.

In some aspects, the signaling that configures the first timing advance and the second timing advance further configures one or more resource characteristics based on which the user equipment shall use the second timing advance.

In some aspects, the first resource and the second resource comprise one of a slot, a symbol, a bandwidth part, or a resource element.

In some aspects, the signaling that configures the first timing advance and the second timing advance is received via downlink control information (DCI) or MAC-CE.

In some aspects, the second resource is a full-duplex slot, as depicted in FIGS. 6, 7 and 8. In some aspects, the method 900 further includes observing a gap period 824 during or after the full-duplex slot prior to transmitting a third uplink communication during a half-duplex slot, as shown in FIG. 8. In some aspects, observing the gap period during the full-duplex slot comprises ignoring one or more final pre-configured symbols in the full-duplex slot.

Note that FIG. 9 is just one example of a method, and other methods including fewer, additional, or alternative steps are possible consistent with this disclosure.

Figure 10:
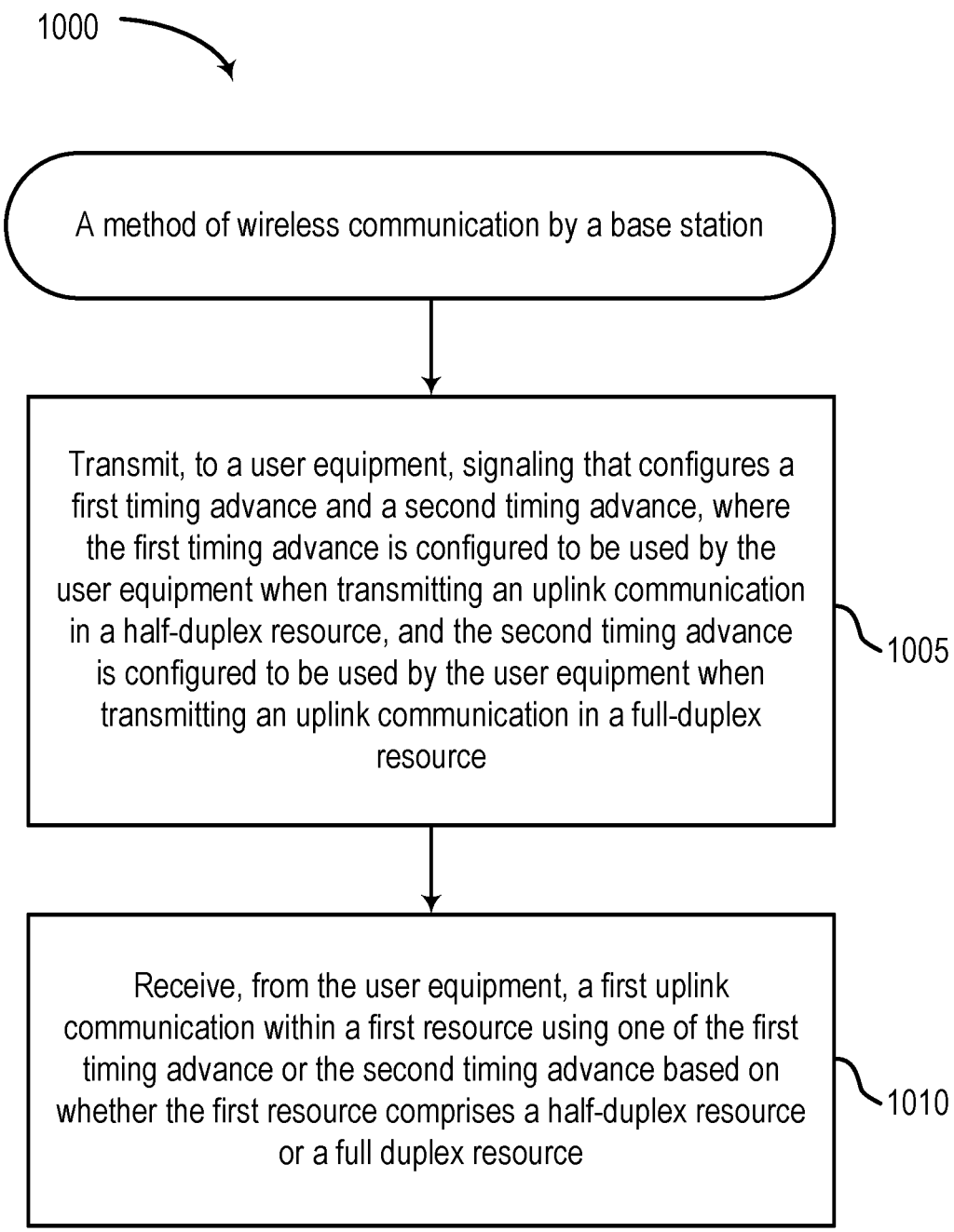
FIG. 10 is a flow diagram illustrating example processes for wireless communication according to aspects of the present disclosure.

FIG. 10 shows an example of a method 1000 for wireless communication according to aspects of the present disclosure. In some aspects, a base station, such as BS 102 of FIGS. 1 and 2, or processing system 1205 of FIG. 12, may perform the method 1000.

Operation 1005 begins with transmitting, to a user equipment, signaling that configures a first timing advance and a second timing advance, where the first timing advance is configured to be used by the user equipment when transmitting an uplink communication in a half-duplex resource, and the second timing advance is configured to be used by the user equipment when transmitting an uplink communication in a full-duplex resource. In some cases, the operations of this step refer to, or may be performed by, uplink timing advance configuration circuitry 1215 as described with reference to FIG. 12.

Operation 1010 continues with receiving, from the user equipment, a first uplink communication within a first resource using one of the first timing advance or the second timing advance based on whether the first resource comprises a half-duplex resource or a full duplex resource. In some cases, the operations of this step refer to, or may be performed by, uplink reception circuitry 1220 as described with reference to FIG. 12.

In some aspects, the first resource comprises a half-duplex resource and the first uplink communication is received using the first timing advance. In some aspects, the method 1000 further includes receiving, from the user equipment, a second uplink communication within a second resource using the second timing advance based on the second resource being a full-duplex resource, as depicted in FIGS. 6, 7 and 8.

In some aspects, the signaling that configures the first timing advance and the second timing advance further configures a first subset of resources in which the user equipment shall use the first timing advance and a second subset of resource in which the user equipment shall use the second timing advance.

In some aspects, the signaling that configures the first timing advance and the second timing advance further configures one or more resource characteristics based on which the user equipment shall use the second timing advance.

In some aspects, the first resource and the second resource comprise one of a slot, a symbol, a bandwidth part, or a resource element.

In some aspects, the signaling that configures the first timing advance and the second timing advance is transmitted via DCI or MAC-CE.

In some aspects, the second resource is a full-duplex slot. In some aspects, the method 600 further includes configuring a gap period 724 during the full-duplex slot 708, as shown in FIG. 7. Some examples further include receiving a third uplink communication during or after a half-duplex 720 slot after the gap period 724. In some aspects, the gap period 724 is configured to be greater than a slot boundary time difference for half-duplex uplink 708 and downlink 712 slots. In some aspects, the gap period 724 is greater than a time period for a half symbol given a subcarrier spacing for the full-duplex slot. In some aspects, the gap period comprises a flexible symbol between a downlink symbol in the full-duplex slot 708 and an uplink symbol in the half-duplex slot 720.

Note that FIG. 10 is just one example of a method, and other methods including fewer, additional, or alternative steps are possible consistent with this disclosure.

Example Wireless Communication Devices

Figure 11:
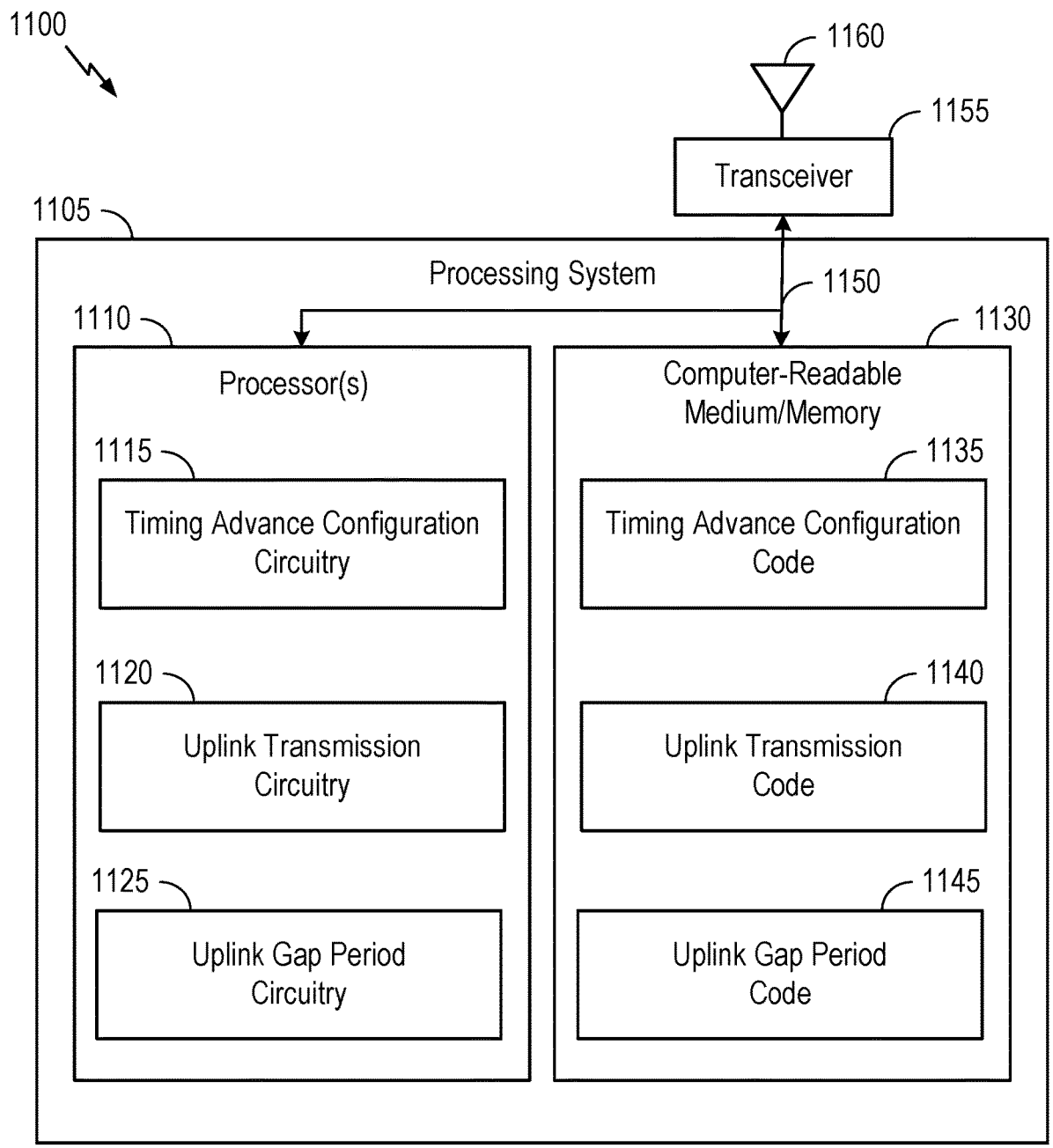
FIG. 11 depicts aspects of an example communications device.

FIG. 11 depicts an example communications device 1100 that includes various components operable, configured, or adapted to perform operations for the techniques disclosed herein. In some examples, communication device may be a UE 104 as described, for example with respect to FIGS. 1 and 2.

Communications device 1100 includes a processing system 1105 coupled to the transceiver 1155 (e.g., a transmitter and/or a receiver). The transceiver 1155 is configured to transmit (or send) and receive signals for the communications device 1100 via the antenna 1160, such as the various signals as described herein. The transceiver 1155 may communicate bi-directionally, via the antennas 1160, wired links, or wireless links as described herein. For example, the transceiver 1155 may represent a wireless transceiver and may communicate bi-directionally with another wireless transceiver. The transceiver 1155 may also include or be connected to a modem to modulate the packets and provide the modulated packets to for transmission, and to demodulate received packets. In some examples, the transceiver 1155 may be tuned to operate at specified frequencies. For example, a modem can configure the transceiver 1155 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1130 via a bus 1150.

In some examples, one or more processors 1110 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1130 is configured to store instructions (e.g., computer-executable code) that when executed by the one or more processors 1110, cause the one or more processors 1110 to perform the operations illustrated in FIG. 9, or other operations for performing the various techniques discussed herein.

In one aspect, computer-readable medium/memory 1130 includes timing advance configuration code 1135, uplink transmission code 1140, and uplink gap period code 1145.

Examples of a computer-readable medium/memory 1130 include random access memory (RAM), read-only memory (ROM), solid state memory, a hard drive, a hard disk drive, etc. In some examples, computer-readable medium/memory 1130 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIG. 9.

In some examples, means for transmitting or sending (or means for outputting for transmission) may include transceivers 254 and/or antenna(s) 252 of the UE 104 illustrated in FIG. 2 and/or the transceiver 1155 and the antenna 1160 of the communication device in FIG. 11.

In some examples, means for receiving (or means for obtaining) may include transceivers 254 and/or antenna(s) 252 of the UE 104 illustrated in FIG. 2 and/or the transceiver 1155 and the antenna 1160 of the communication device in FIG. 11.

In some examples, means for configuring timing advances may include various processing system 1105 components, such as: the one or more processors 1110 in FIG. 11, or aspects of the UE 104 depicted in FIG. 2, including receive processor 258, transmit processor 264, TX MIMO processor 266, and/or controller/processor 280.

In one aspect, one or more processors 1110 includes timing advance configuration circuitry 1115, uplink transmission circuitry 1120, and uplink gap period circuitry 1125.

According to some aspects, timing advance configuration circuitry 1115 receives at a user equipment from a base station signaling configuring a first timing advance and a second timing advance, where the first timing advance is configured to be used by the user equipment when transmitting an uplink communication in a half-duplex resource, and the second timing advance is configured to be used by the user equipment when transmitting an uplink communication in a full-duplex resource.

According to some aspects, uplink transmission circuitry 1120 transmits from the user equipment to the base station a first uplink communication within a first resource using one of the first timing advance or the second timing advance based on whether the first resource is a half-duplex resource or a full duplex resource.

In some aspects, the first resource includes a half-duplex resource, and the first uplink communication is transmitted using the first timing advance. In some examples, uplink transmission circuitry 1120 transmits from the user equipment to the base station a second uplink communication within a second resource using the second timing advance based on the second resource being a full-duplex resource.

In some aspects, the signaling configuring the first timing advance and the second timing advance further configures a first subset of resources in which the user equipment shall use the first timing advance and a second subset of resource in which the user equipment shall use the second timing advance. In some aspects, the signaling configuring the first timing advance and the second timing advance further configures one or more resource characteristics based on which the user equipment shall use the second timing advance. In some aspects, the first resource and the second resource include one of a slot, a symbol, a bandwidth part, or a resource element. In some aspects, the signaling configuring the first timing advance and the second timing advance is received via DCI or MAC-CE.

In some aspects, the second resource is a full-duplex slot. According to some aspects, uplink gap period circuitry 1125 observes a gap period during or after the full-duplex slot prior to transmitting a third uplink communication during a half-duplex slot. In some examples, uplink gap period circuitry 1125 observes the gap period during the full-duplex slot by ignoring one or more final preconfigured symbols in the full-duplex slot.

Notably, FIG. 11 is just one example, and many other examples and configurations of communication device are possible.

Figure 12:
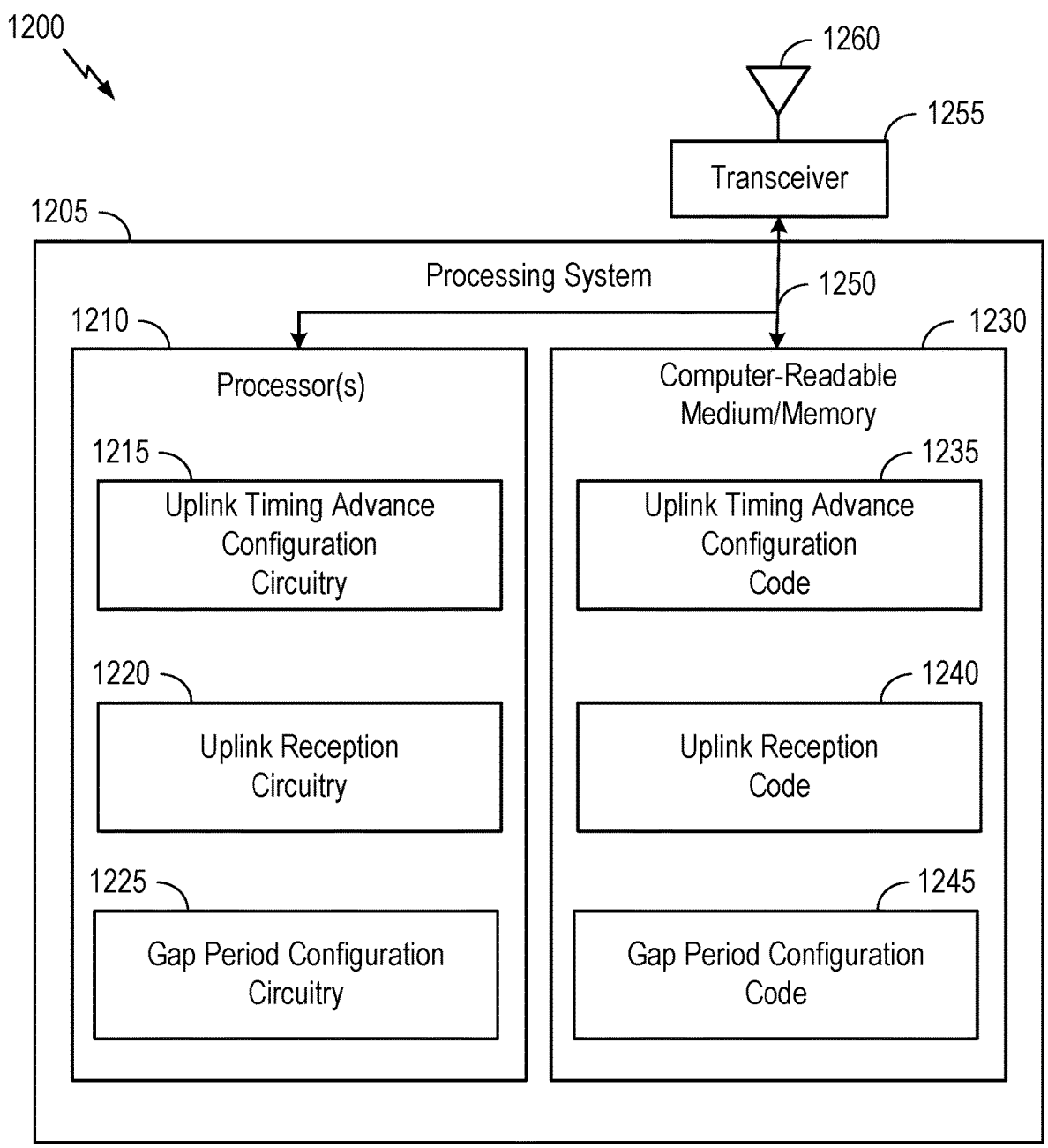
FIG. 12 depicts aspects of another example communications device.

FIG. 12 depicts an example communications device 1200 that includes various components operable, configured, or adapted to perform operations for the techniques disclosed herein, such as the operations depicted and described with respect to FIGS. 5-8 and 10. In some examples, communication device may be a BS 102 as described, for example with respect to FIGS. 1, 2, and 10.

Communications device 1200 includes a processing system 1205 coupled to the transceiver 1255 (e.g., a transmitter and/or a receiver). The transceiver 1255 is configured to transmit (or send) and receive signals for the communications device 1200 via the antenna 1260, such as the various signals as described herein. The transceiver 1255 may communicate bi-directionally, via the antennas 1260, wired links, or wireless links as described herein. For example, the transceiver 1255 may represent a wireless transceiver and may communicate bi-directionally with another wireless transceiver. The transceiver 1255 may also include or be connected to a modem to modulate the packets and provide the modulated packets to for transmission, and to demodulate received packets. In some examples, the transceiver 1255 may be tuned to operate at specified frequencies. For example, a modem can configure the transceiver 1255 to operate at a specified frequency and power level based on the communication protocol used by the modem.

Processing system 1205 may be configured to perform processing functions for communications device 1200, including processing signals received and/or to be transmitted by communications device 1200. Processing system 1205 includes one or more processors 1210 coupled to a computer-readable medium/memory 1230 via a bus 1250.

In some examples, one or more processors 1210 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1210 are configured to operate a memory array using a memory controller. In other cases, a memory controller is integrated into the one or more processors 1210. In some cases, the one or more processors 1210 are configured to execute computer-readable instructions stored in a memory to perform various functions. In some aspects, one or more processors 1210 include special purpose components for modem processing, baseband processing, digital signal processing, or transmission processing.

In certain aspects, computer-readable medium/memory 1230 is configured to store instructions (e.g., computer-executable code) that when executed by the one or more processors 1210, cause the one or more processors 1210 to perform the operations illustrated in FIGS. 5-8 and 10, or other operations for performing the various techniques discussed herein.

In one aspect, computer-readable medium/memory 1230 includes uplink timing advance configuration code 1235, uplink reception code 1240, and gap period configuration code 1245.

Examples of a computer-readable medium/memory 1230 include RAM, ROM, solid state memory, a hard drive, a hard disk drive, etc. In some examples, computer-readable medium/memory 1230 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1200 may provide means for performing the methods described herein, including with respect to FIG. 10.

In some examples, means for transmitting or sending (or means for outputting for transmission) may include transceivers 232 and/or antenna(s) 234 of the BS 102 illustrated in FIG. 2 and/or the transceiver 1255 and the antenna 1260 of the communication device in FIG. 12.

In some examples, means for receiving (or means for obtaining) may include transceivers 232 and/or antenna(s) 234 of the BS 102 illustrated in FIG. 2 and/or the transceiver 1255 and the antenna 1260 of the communication device in FIG. 12.

In some examples, means for configuring timing advances may include various processing system 1205 components, such as: the one or more processors 1210 in FIG. 12, or aspects of the BS 102 depicted in FIG. 2, including receive processor 2312, transmit processor 220, TX MIMO processor 230, and/or controller/processor 240.

In one aspect, one or more processors 1210 includes uplink timing advance configuration circuitry 1215, uplink reception circuitry 1220, and gap period configuration circuitry 1225.

According to some aspects, uplink timing advance configuration circuitry 1215 transmits to a user equipment from a base station signaling configuring a first timing advance and a second timing advance, where the first timing advance is configured to be used by the user equipment when transmitting an uplink communication in a half-duplex resource, and the second timing advance is configured to be used by the user equipment when transmitting an uplink communication in a full-duplex resource.

According to some aspects, uplink reception circuitry 1220 receives from the user equipment at the base station a first uplink communication within a first resource using one of the first timing advance or the second timing advance based on whether the first resource is a half-duplex resource or a full duplex resource.

In some aspects, the first resource includes a half-duplex resource and the first uplink communication is received using the first timing advance. In some examples, uplink reception circuitry 1220 receives from the user equipment at the base station a second uplink communication within a second resource using the second timing advance based on the second resource being a full-duplex resource.

In some aspects, the signaling configuring the first timing advance and the second timing advance further configures a first subset of resources in which the user equipment shall use the first timing advance and a second subset of resource in which the user equipment shall use the second timing advance. In some aspects, the signaling configuring the first timing advance and the second timing advance further configures one or more resource characteristics based on which the user equipment shall use the second timing advance. In some aspects, the first resource and the second resource include one of a slot, a symbol, a bandwidth part, or a resource element. In some aspects, the signaling configuring the first timing advance and the second timing advance is transmitted via DCI or MAC-CE.

In some aspects, the second resource is a full-duplex slot. According to some aspects, gap period configuration circuitry 1225 configures a gap period during the full-duplex slot. In some examples, uplink reception circuitry 1220 receives a third uplink communication during or after a half-duplex slot after the gap period. In some aspects, the gap period is configured to be greater than a slot boundary time difference for half-duplex uplink and downlink slots. In some aspects, the gap period is greater than a time period for a half symbol given a subcarrier spacing for the full-duplex slot. In some aspects, the gap period includes a flexible symbol between a downlink symbol in the full-duplex slot and an uplink symbol in the half-duplex slot.

Notably, FIG. 12 is just one example, and many other examples and configurations of communication device are possible.

Example Clauses

Implementation examples are described in the following numbered clauses:

Clause 1: A method for wireless communications by a user equipment, comprising: receiving, from a base station, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource; and transmitting, to the base station, a first uplink communication within a first resource using one of the first timing advance or the second timing advance based on whether the first resource comprises a half-duplex resource or a full duplex resource.

Clause 2: The method of Clause 1, wherein: the first resource comprises a half-duplex resource, the first uplink communication is transmitted using the first timing advance, and the method further comprises transmitting, to the base station, a second uplink communication within a second resource using the second timing advance based on the second resource being a full-duplex resource.

Clause 3: The method of Clause 2, wherein the signaling that configures the first timing advance and the second timing advance further configures: a first subset of resources in which the user equipment shall use the first timing advance; and a second subset of resource in which the user equipment shall use the second timing advance.

Clause 4: The method of any one of Clauses 2-3, wherein the signaling that configures the first timing advance and the second timing advance further configures one or more resource characteristics based on which the user equipment shall use the second timing advance.

Clause 5: The method of any one of Clauses 2-4, wherein the first resource and the second resource comprise one of a slot, a symbol, a bandwidth part, or a resource element.

Clause 6: The method of any one of Clauses 1-5, wherein the signaling that configures the first timing advance and the second timing advance is received via DCI or MAC-CE.

Clause 7: The method of any one of Clauses 2-6, wherein: the second resource is a full-duplex slot, and the method further comprises observing a gap period during or after the full-duplex slot prior to transmitting a third uplink communication during a half-duplex slot.

Clause 8: The method of Clause 7, wherein observing the gap period during the full-duplex slot comprises ignoring one or more final preconfigured symbols in the full-duplex slot.

Clause 9: A method for wireless communications by a base station, comprising: transmitting, to a user equipment, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource; and receiving, from the user equipment, a first uplink communication within a first resource using one of the first timing advance or the second timing advance based on whether the first resource is a half-duplex resource or a full duplex resource.

Clause 10: The method of Clause 9, wherein: the first resource comprises a half-duplex resource, the first uplink communication is received using the first timing advance, and the method further comprises receiving, from the user equipment, a second uplink communication within a second resource using the second timing advance based on the second resource being a full-duplex resource.

Clause 11: The method of Clause 10, wherein the signaling that configures the first timing advance and the second timing advance further configures: a first subset of resources in which the user equipment shall use the first timing advance; and a second subset of resource in which the user equipment shall use the second timing advance.

Clause 12: The method of any one of Clauses 10-11, wherein the signaling that configures the first timing advance and the second timing advance further configures one or more resource characteristics based on which the user equipment shall use the second timing advance.

Clause 13: The method of any one of Clauses 10-12, wherein the first resource and the second resource comprise one of a slot, a symbol, a bandwidth part, or a resource element.

Clause 14: The method of any one of Clauses 9-13, wherein the signaling that configures the first timing advance and the second timing advance is transmitted via DCI or MAC-CE.

Clause 15: The method of any one of Clauses 10-14, wherein: the second resource is a full-duplex slot, and the method further comprises: configuring a gap period during the full-duplex slot and receiving a third uplink communication during or after a half-duplex slot after the gap period.

Clause 16: The method of Clause 15, wherein the gap period is configured to be greater than a slot boundary time difference for half-duplex uplink and downlink slots.

Clause 17: The method of Clause 15, wherein the gap period is greater than a time period for a half symbol given a subcarrier spacing for the full-duplex slot.

Clause 18: The method of Clause 15, wherein the gap period comprises a flexible symbol between a downlink symbol in the full-duplex slot and an uplink symbol in the half-duplex slot.

Clause 19: An apparatus, comprising: a memory comprising executable instructions; and one or more processors configured to execute the executable instructions and cause the apparatus to perform a method in accordance with any one of Clauses 1-18.

Clause 20: An apparatus, comprising means for performing a method in accordance with any one of Clauses 1-18.

Clause 21: A non-transitory computer-readable medium comprising executable instructions that, when executed by one or more processors of an apparatus, cause the apparatus to perform a method in accordance with any one of Clauses 1-18.

Clause 22: A computer program product embodied on a computer-readable storage medium comprising code for performing a method in accordance with any one of Clauses 1-18.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μS.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of configuring timing advances for uplink communication resources in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment, comprising:
   receiving, from a base station, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource;
   transmitting, to the base station, a first uplink communication within a first resource using the first timing advance based on the first resource being a half-duplex resource;
   transmitting, to the base station, a second uplink communication within a second resource using the second timing advance based on the second resource being a full-duplex resource, wherein the second resource is a full-duplex slot;
   observing a gap period during or after the full-duplex slot; and
   transmitting, after the gap period, a third uplink communication during or after a half-duplex slot,
   wherein the gap period is a flexible symbol between a downlink symbol in the full-duplex slot and an uplink symbol in the half-duplex slot.

2. The method of claim 1, wherein the signaling that configures the first timing advance and the second timing advance further configures:
   a first subset of resources in which the user equipment shall use the first timing advance, and
   a second subset of resources in which the user equipment shall use the second timing advance.

3. The method of claim 1, wherein the signaling that configures the first timing advance and the second timing advance further configures one or more resource characteristics based on which the user equipment shall use the second timing advance.

4. The method of claim 1, wherein the first resource comprises a slot.

5. The method of claim 1, wherein the signaling that configures the first timing advance and the second timing advance is received via downlink control information (DCI) or medium access control-control element (MAC-CE).

6. A method for wireless communications by a base station, comprising:
   transmitting, to a user equipment, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource;
   receiving, from the user equipment, a first uplink communication within a first resource using the first timing advance based on the first resource being a half-duplex resource;
   receiving, from the user equipment, a second uplink communication within a second resource using the second timing advance based on the second resource being a full-duplex resource, wherein the second resource is a full-duplex slot;
   configuring a gap period during or after the full-duplex slot;
   and receiving a third uplink communication during or after a half-duplex slot after the gap period,
   wherein the gap period is a flexible symbol between a downlink symbol in the full-duplex slot and an uplink symbol in the half-duplex slot.

7. The method of claim 6, wherein the signaling that configures the first timing advance and the second timing advance further configures:
   a first subset of resources in which the user equipment shall use the first timing advance; and
   a second subset of resource in which the user equipment shall use the second timing advance.

8. The method of claim 6, wherein the signaling that configures the first timing advance and the second timing advance further configures one or more resource characteristics based on which the user equipment shall use the second timing advance.

9. The method of claim 6, wherein the first resource comprises a slot.

10. The method of claim 6, wherein the signaling that configures the first timing advance and the second timing advance is transmitted via downlink control information (DCI) or medium access control-control element (MAC-CE).

11. An apparatus for wireless communication at a user equipment, comprising: a memory comprising executable instructions; and one or more processors configured to execute the executable instructions and cause the user equipment to:
   receive, from a base station, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource;
   transmit, to the base station, a first uplink communication within a first resource using the first timing advance based on the first resource being a half-duplex resource;
   transmit, to the base station, a second uplink communication within a second resource using the second timing advance based on the second resource being a full-duplex resource, wherein the second resource is a full-duplex slot;
   observe a gap period during or after the full-duplex slot; and
   transmit, after the gap period, a third uplink communication during or after a half-duplex slot,
   wherein the gap period is a flexible symbol between a downlink symbol in the full-duplex slot and an uplink symbol in the half-duplex slot.

12. An apparatus for wireless communication at a base station, comprising:
   a memory comprising executable instructions; and one or more processors configured to execute the executable instructions and cause the base station to:
   transmit, to a user equipment, signaling that configures a first timing advance and a second timing advance, wherein the first timing advance is configured to be used by the user equipment when transmitting an uplink communication in a half-duplex resource, and the second timing advance is configured to be used by the user equipment when transmitting an uplink communication in a full-duplex resource;

receive, from the user equipment, a first uplink communication within a first resource using the first timing advance based on the first resource being a half-duplex resource;

receive, from the user equipment, a second uplink communication within a second resource using the second timing advance based on the second resource being a full-duplex resource, wherein the second resource is a full-duplex slot;

configure a gap period during or after the full-duplex slot; and receive a third uplink communication during or after a half-duplex slot after the gap period, wherein the gap period is a flexible symbol between a downlink symbol in the full-duplex slot and an uplink symbol in the half-duplex slot.

13. The apparatus of claim 12, wherein the signaling that configures the first timing advance and the second timing advance further configures:

a first subset of resources in which the user equipment shall use the first timing advance; and a second subset of resource in which the user equipment shall use the second timing advance.

14. The apparatus of claim 12, wherein the signaling that configures the first timing advance and the second timing advance further configures one or more resource characteristics based on which the user equipment shall use the second timing advance.

15. The apparatus of claim 12, wherein the first resource comprises a slot.

16. The apparatus of claim 12, wherein the one or more processors, to transmit the signaling, are configured to execute the executable instructions and cause the base station to transmit the signaling via downlink control information (DCI) or medium access control-control element (MAC-CE).

17. The apparatus of claim 11, wherein the signaling that configures the first timing advance and the second timing advance further configures:

a first subset of resources in which the user equipment shall use the first timing advance, and a second subset of resources in which the user equipment shall use the second timing advance.

18. The apparatus of claim 11, wherein the signaling that configures the first timing advance and the second timing advance further configures one or more resource characteristics based on which the user equipment shall use the second timing advance.

19. The apparatus of claim 11, wherein the first resource comprises a slot.

20. The apparatus of claim 11, wherein the one or more processors, to receive the signaling, are configured to execute the executable instructions and cause the user equipment to receive the signaling via downlink control information (DCI) or medium access control-control element (MAC-CE).

* * * * *